(12) United States Patent
Camarillo

(10) Patent No.: US 6,970,880 B2
(45) Date of Patent: Nov. 29, 2005

(54) SYSTEM AND METHOD FOR CREATING AND MAINTAINING DATA RECORDS TO IMPROVE ACCURACY THEREOF

(75) Inventor: David W. Camarillo, Portland, OR (US)

(73) Assignee: Metro One Telecommunications, Inc., Beaverton, OR (US)

( * ) Notice: Subject to any disclaimer, the term of this patent is extended or adjusted under 35 U.S.C. 154(b) by 566 days.

(21) Appl. No.: 09/992,987

(22) Filed: Nov. 14, 2001

(65) Prior Publication Data

US 2003/0041068 A1  Feb. 27, 2003

Related U.S. Application Data

(60) Provisional application No. 60/314,722, filed on Aug. 24, 2001.

(51) Int. Cl.⁷ ............................................. G06F 17/30
(52) U.S. Cl. ................................... 707/102; 10/104.1
(58) Field of Search .......................... 707/3, 4, 10, 102, 707/104.1, 101; 709/203, 219

(56) References Cited

U.S. PATENT DOCUMENTS

| | | | | |
|---|---|---|---|---|
| 5,504,890 A | * | 4/1996 | Sanford | 707/3 |
| 5,664,109 A | * | 9/1997 | Johnson et al. | 705/2 |
| 5,701,423 A | * | 12/1997 | Crozier | 715/762 |
| 5,781,773 A | * | 7/1998 | Vanderpool et al. | 707/100 |
| 6,023,659 A | * | 2/2000 | Seilhamer et al. | 702/19 |
| 6,052,693 A | * | 4/2000 | Smith et al. | 707/104.1 |
| 6,151,601 A | * | 11/2000 | Papierniak et al. | 707/10 |
| 6,154,748 A | * | 11/2000 | Gupta et al. | 707/102 |
| 6,389,429 B1 | * | 5/2002 | Kane et al. | 707/200 |
| 6,668,253 B1 | * | 12/2003 | Thompson et al. | 707/10 |
| 2002/0055932 A1 | * | 5/2002 | Wheeler et al. | 707/104.1 |

FOREIGN PATENT DOCUMENTS

WO  WO 0042544  *  7/2000

* cited by examiner

Primary Examiner—Leslie Wong
(74) Attorney, Agent, or Firm—Kaye Scholer LLP (57) ABSTRACT

In a system which receives, from different sources, data having various formats, the received data is selected and combined in accordance with the invention to create accurate records. Specifically, the inventive system organizes the received data into uniform data records having a predetermined format. The data in the uniform data records is converted, if necessary, to conform to a predetermined nomenclature, resulting in normalized data records. The normalized data records are grouped into sets of equivalent records. For each set, the inventive system selects relatively accurate data from the equivalent records in the set to create a final record.

21 Claims, 6 Drawing Sheets

SYSTEM AND METHOD FOR CREATING AND MAINTAINING DATA RECORDS TO IMPROVE ACCURACY THEREOF

This application claims priority of provisional application Ser. No. 60/314,722 filed on Aug. 24, 2001.

BACKGROUND OF THE INVENTION

The invention relates to a system and method for creating and maintaining data records. More particularly, the invention relates to a system and method for processing data from different sources which is in various formats to create records.

It is a common experience to call a telephone operator at a call center for information assistance. In a typical information assistance call, a customer identifies to the operator the name and address of a party whose telephone number is desired. In response, the operator locates the desired destination number using a computer database and the destination number is provided to the customer.

Typically, the computer database includes data from various data providers. These data providers may be telecommunication companies, such as Pacific Bell, GTE, or AT&T, to name a few. The data usually includes records having listing names, addresses, and telephone numbers of individuals and businesses throughout the United States and other countries. When processing millions of records (e.g., telephone listings) the reliability of the records becomes an issue. For example, a 5% error rate in data, comprising 300,000,000 records, yields 15,000,000 erroneous records. Since each data provider submits similar data, combining data from the various data providers is useful in creating accurate records. However, combining data is not easy because each data provider uses a different data format and the quality of data varies from provider to provider. Often data among the various data providers is inconsistent. For example, data representing a listing Diana Elizabeth Nicholls of 20 West 64TH Street from one data provider may look like Nicholls, Diana E. of 20 W 64th St from another data provider. Even though these listings represent the same person, the differences in format and nomenclature make it difficult for a computer database to determine whether the listings represent the same person or entity, and to combine and compare data. Accordingly, there is a need for a technique for processing data having various formats, which effectively selects and combines the data to create accurate records.

SUMMARY OF THE INVENTION

In accordance with the invention, after data (e.g., telephone directory listing data) in various formats is received from different sources (e.g., telecommunications companies), the data is organized into records having a predetermined format. The resulting data in the predetermined format is checked, and converted, if necessary, to conform to a predetermined nomenclature. Once the data in the records are in the predetermined format and in conformance to the predetermined nomenclature, the records are grouped into sets of potentially equivalent records. For example, each set pertains to a listing of a telephone directory. The actually equivalent records are then identified for each set. Data fields in the identified records in the set which are relatively accurate are selected to form a final record concerning the listing to which the set pertains.

DETAILED DESCRIPTION

Figure 1:
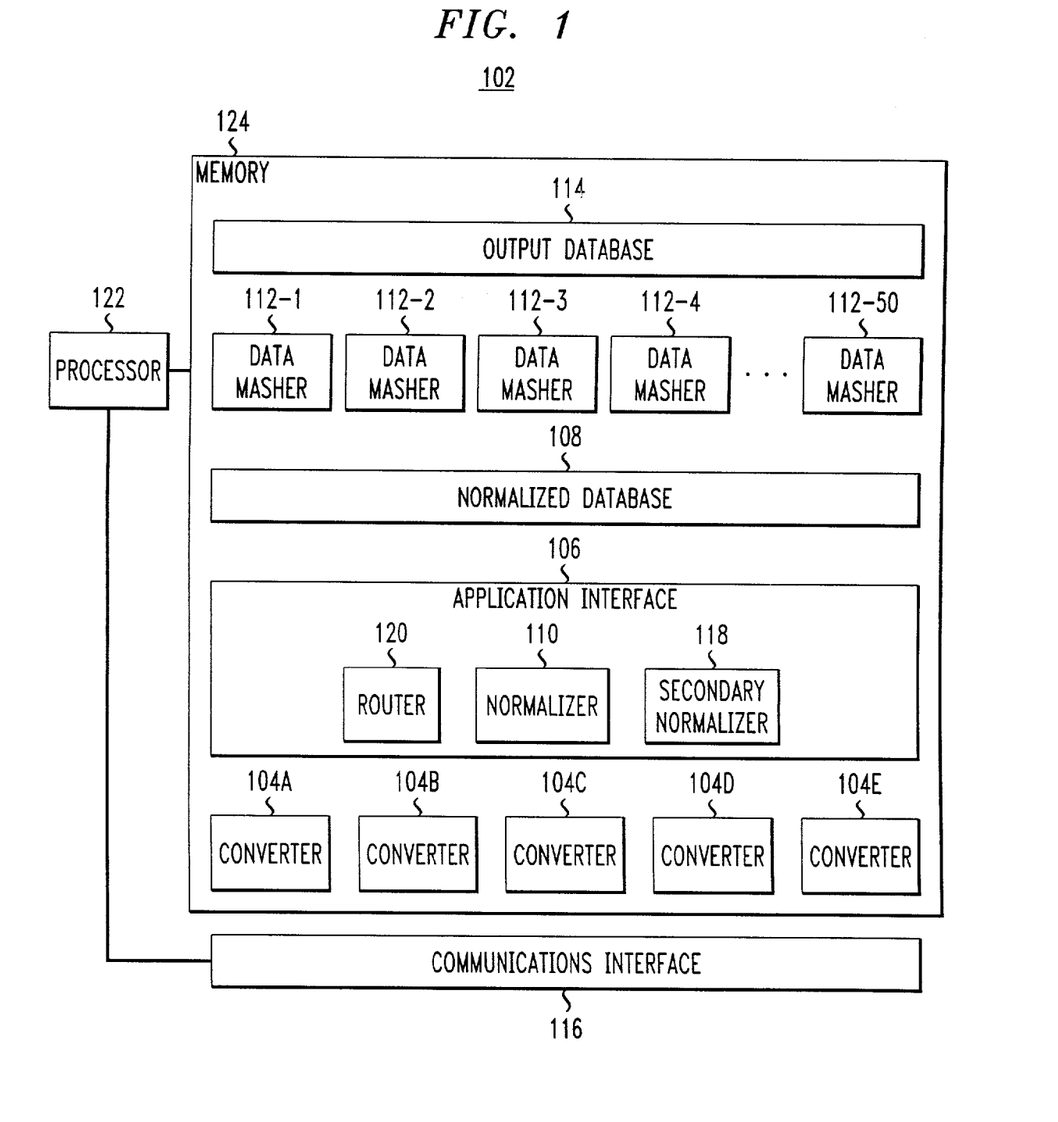
FIG. 1 is a block diagram of a system for creating and maintaining data records in accordance with the invention.

FIG. 1 is a block diagram of system 102 which embodies the principles of the invention. After receiving source data having various formats from different sources or data providers, system 102 selectively combines the source data into a database containing records in accordance with the invention. System 102 also provides the capability of adding and deleting records in the database, without having to reprocess all of the data.

System 102 may be a computer, for example, a PC type computer, which is capable of communicating with data providers over the Internet, intranet, and other networks. As shown in FIG. 1, system 102 includes processor 122, memory 124, and communications interface 116. Memory 124 contains, among others, converter routines 104A–104E, application programming interface (API) routine 106, normalized database 108, data masher routines 112-1 through 112-50, and output database 114.

In this instance, the data providers are telecommunication companies such as AT&T, GTE, and Pacific Bell. The source data includes records that are used by an information assistance system. For example, the source data can include names, addresses, and telephone numbers of people in various regions of the country or world.

It should be realized that system 102 can provide service concurrently to many computers, such as those operated by data providers and information assistance providers.

Operationally, various data providers send large amounts of source data, via a computer network, to system 102. For example, converter routines 104A–104E within system 102 convert the source data, from the various data providers, to a predetermined format to form uniform data, in a manner described below. Instructed by converter routines 104A–104E, system 102 combines source data from the various data providers to create records for use in, for example, the well known information directory assistance service. Additionally, system 102 provides the capability of adding and deleting records, without having to reprocess all of the uniform data. In general the routines in system 102 comprise computer-executable code (i.e. processing instructions), which are used to build a database of records, and add and delete one or more records in the database. The routines are stored in memory 124 generically representing here one or more computer memories such as floppy disks, hard disks, CD-ROMs, Flash RAMs, other ROMs and RAMs, or a combination thereof.

Communications interface 116, which is conventional, connects system 102 to data providers' computers, via the Internet, pursuant to the well-known transmission control protocol/Internet protocol (TCP/IP). Communications interface 116, includes multiple data channels for receiving the source data from the various data providers. The received source data is processed according to their corresponding converters routines 104A–104E in a manner described below. Communications interface 116 also includes a standard interface with various information assistance systems. It should be realized that data from the various data providers can be downloaded into system 102 via CDROM, floppy disks, tape, and/or other high and low density storage mediums.

Figure 2:
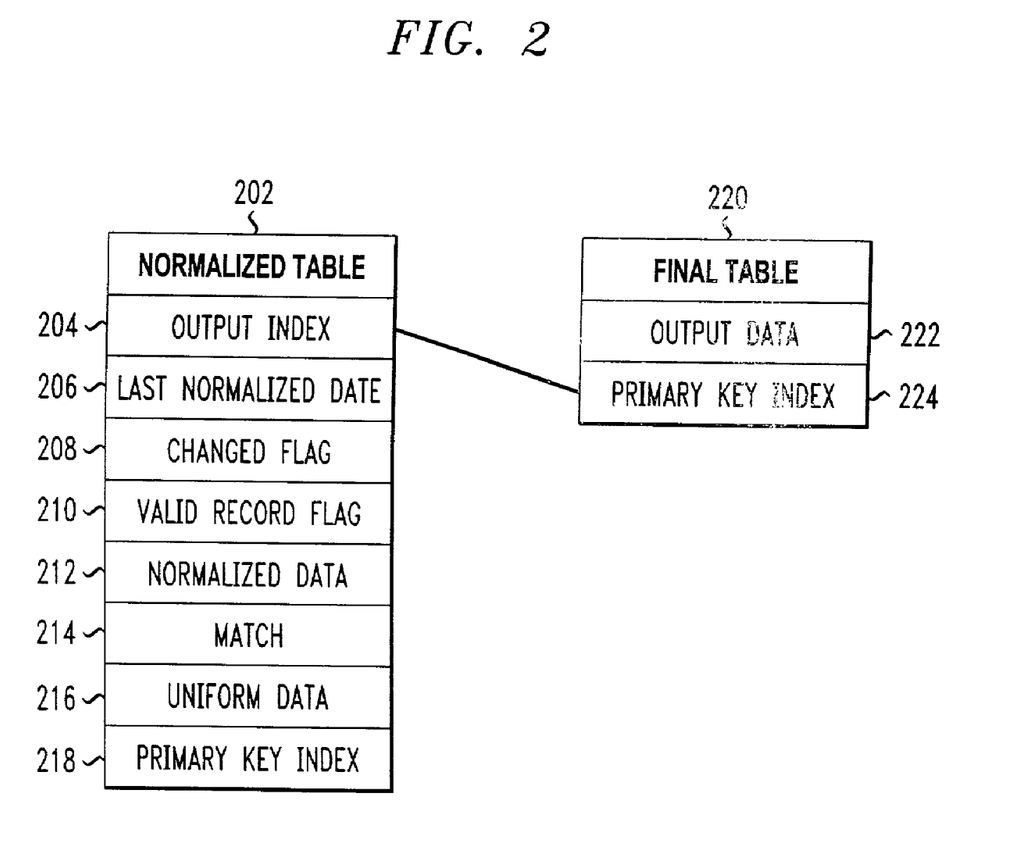
FIG. 2 illustrates a relational database structure for the normalized database of FIG. 1.

Normalized database 108 includes a relational database, e.g., Oracle8i, which is capable of creating and running queries, adding rows, creating tables and new users, modifying data, exporting or importing data, storing and reading data in a table format, creating and writing reports and macros, to name only a few functions. To manage the large amount of source data, normalized database 108 is sectioned into 50 normalized tables corresponding to 50 States in the United States. It should be realized that sectioning the normalized tables into States is for convenience and that database 108 can be sectioned differently, if sectioned at all. It should also be realized the particular number of normalized tables and States is for illustrative purposes and the number of tables can be increased, for example, to include representation of the provinces of Canada. FIG. 2 illustrates Normalized Table 202, which maintains source data from the various data providers that are associated with a State.

Like normalized database 108, output database 114 includes a relational database, e.g., Oracle8i, which is sectioned into tables corresponding to 50 States in the United States of America. Again, it should be realized that sectioning the tables into States is for convenience and that output database 114 can be sectioned differently, if at all. FIG. 2 also illustrates a Final Table 220, which maintains output data that is associated with a State.

It should be realized that databases 108 and 114 are illustrated separately, but may be combined into one database or expanded to three or more databases. Normalized database 108 and output database 114 reside in memory 124 and are coupled to the other modules, such as API routine 106, data masher routines 112-1 through 112-50, converter routines 104A–104E, and communications interface 116, by communication busses within system 102.

Figure 3:
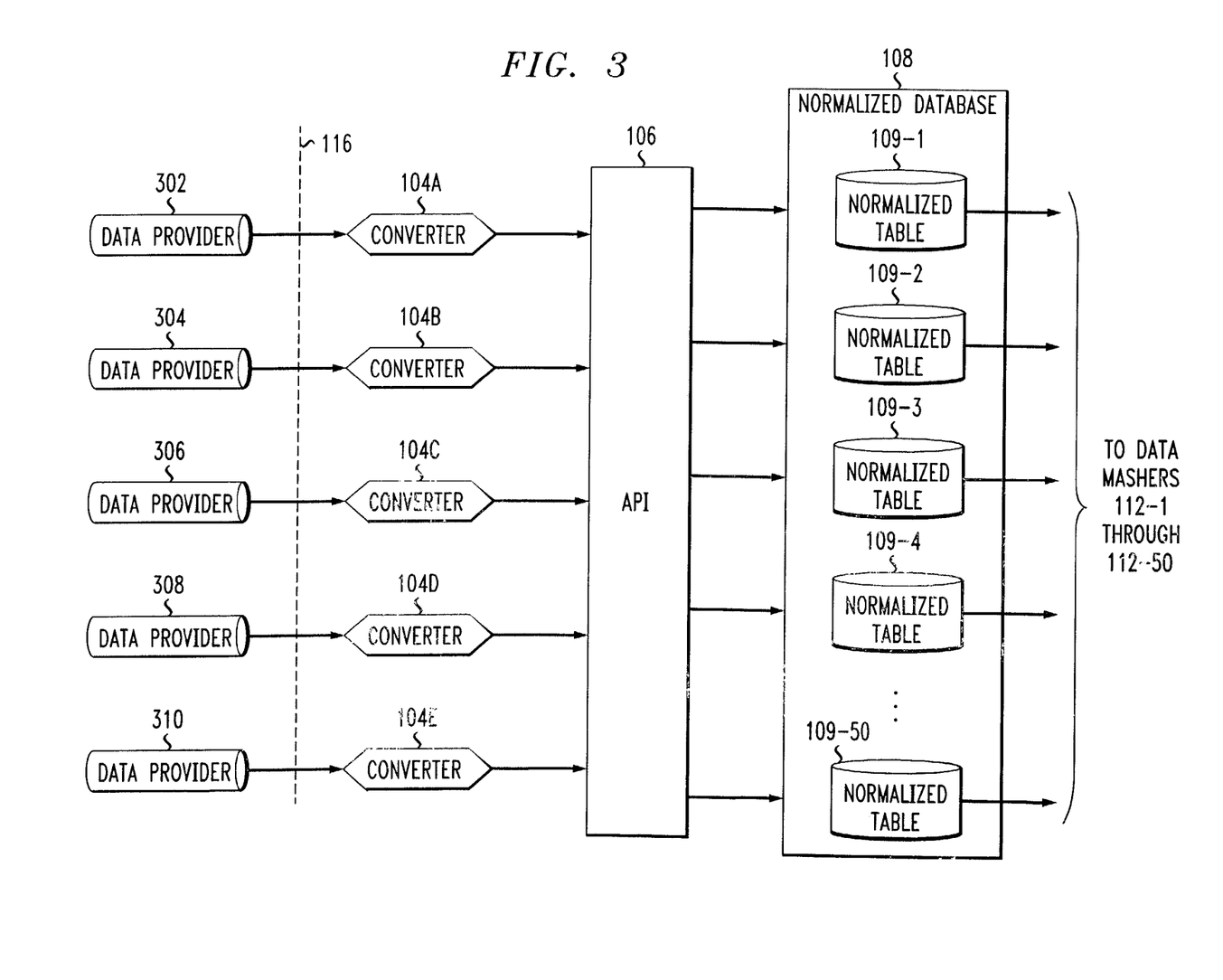
FIG. 3 illustrates a data flow diagram of the front end of the system of FIG. 1.

FIG. 3 is a data flow diagram of the front end of system 102. In this particular illustrative embodiment, converter routines 104A–104E are specifically designed to interface, via communications interface 116, with data providers 302–310, respectively. It should be realized that a skilled artisan could combine the five converter routines (104A–104E) into a single routine. It should also be realized that more or less than five data providers and converter routines can be implemented in system 102. Instructed by converter routines 104A–104E, processor 122 receives source data from data providers 302–310 connected to system 102 and convert the source data into uniform data having a predetermined format (hereinafter referred to as a "uniform format"). Because the source data is from various data providers, the organization of the source data often differs from one data provider to another. As a result, the organization of source data records and data within tables often differ from one data provider to another. To accommodate for the differences in the organization of source data, each converter routine 104A–104E is used to separate, rearrange, and/or combine source data into the uniform format including uniform tables and fields.

Figure 4A:
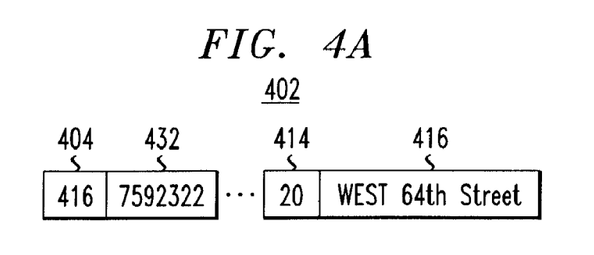
FIGS. 4A and 4B illustrate source data records form data providers.
Figure 4B:
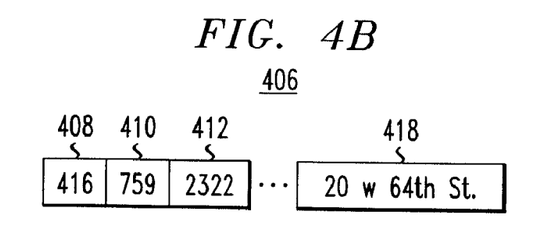

The data providers from time to time send source data arranged in a nonuniform format, such as, city name, telephone number, listing name, address, facsimile numbers, URLs, etc. For example, data provider 302 may provide source data record 402 having a telephone number in two telephone number fields 404, 432. On the other hand, data provider 304 may provide source data record 406 in FIG. 4B having the same telephone number in three separate telephone number fields, namely, field 408 containing a number plan area (NPA) (also known as an area code), field 410 containing a three-digit prefix, and field 412 containing the remaining four digits. In addition, data provider 302 may provide source data record 402 having address fields structured with house number and street name in separate fields 414 and 416, respectively, while data provider 304 may provide source data record 406 having a single address field 418 with fields having the complete address.

Figure 4C:
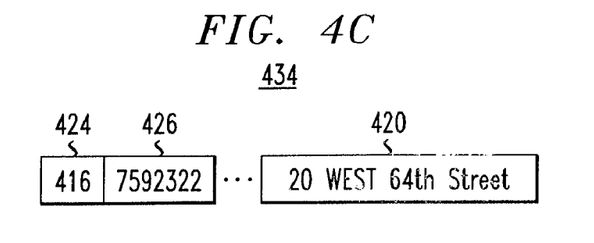
FIGS. 4C and 4D illustrate uniform data records in a predetermined format.
Figure 4D:
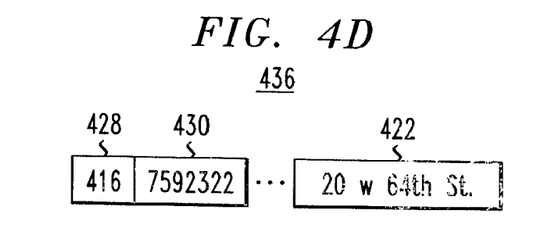

Source data records 402 and 406 are processed using the respective converter routines to form the corresponding uniform data records 434 in FIG. 4C and 436 in FIG. 4D both in the uniform format. By way of example, the uniform format in this instance is such that all address information is arranged in a single address field. To that end converter routines 104A–104E arrange all address data in a source data record that is not in a single address field, e.g., fields 414 and 416 in record 402, into a single address field in uniform data record, e.g., field 420 in record 434. However, the address information, which has already been arranged in a single address field, such as field 418 of source data record 406, it does not have to be changed because it is already consistent with the uniform format and can be directly transferred to field location 422. In addition, the uniform format in this instance requires that a telephone number in a source data record be arranged in two telephone number fields in a uniform data record, e.g., fields 424 and 426 in record 434, and, e.g., fields 428 and 430 in record 436. To that end, converter routines 104A–104E rearrange the data into two fields, such as in fields 428 and 430. If the data provider 302 provides source data having telephone numbers in two telephone number fields 404 and 432, then converter routine 104A–104E will not rearrange the telephone numbers, such as in the case of telephone number fields 424 and 426. The resulting uniform data records are stored in Uniform Data location 216 in FIG. 2.

In addition, converter routines 104A–104E instruct processor 122 to assign predetermined field identifiers to the uniform data record fields 424, 426, 420, 428, 430 and 422. The predetermined identifiers indicate the order of which the fields are arranged in Uniform Data location 216 and in Normalized Data location 212, after the uniform data is normalized in a manner described below.

Figure 5:
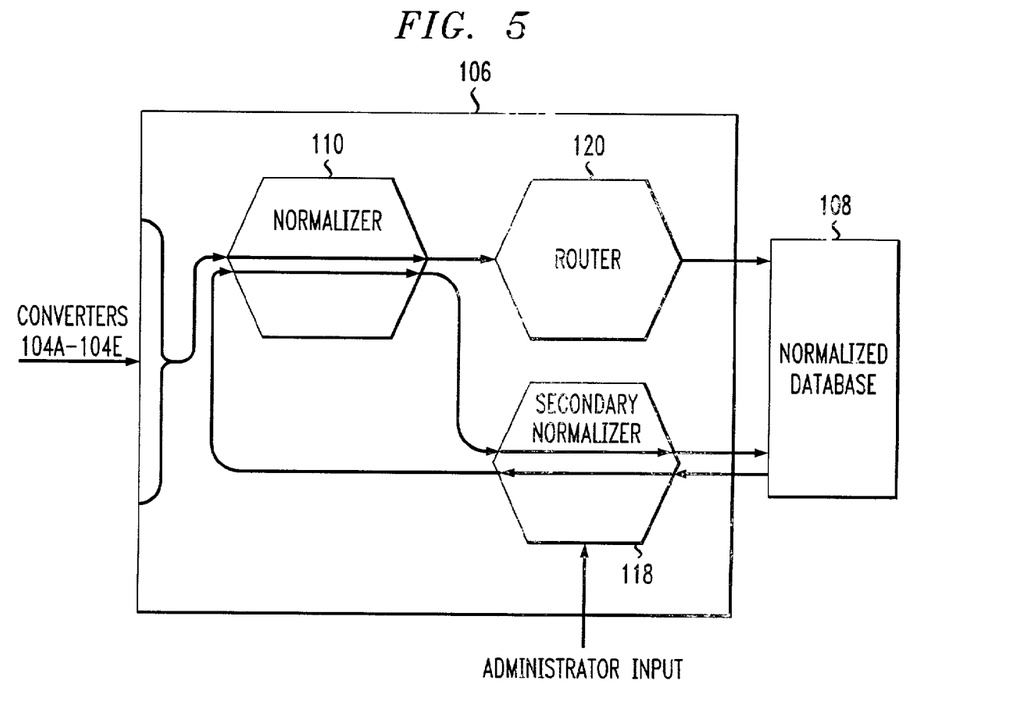
FIG. 5 illustrates a data flow diagram of the application interface of the system of FIG. 1.

FIG. 5 illustrates a data flow diagram of API routine 106, which includes additional routines such as normalizer routine 110, secondary normalizer routine 118, and router routine 120. API routine 106 instructs processor 122 to configure an instance to process uniform data attributed to each data provider. For example, a first instance is associated with the Pacific Bell source, a second instance is associated with the GTE source, and a third instance is associated with the Southwest Bell source. According to the instances, which operate in parallel with each other, processor 122 inserts a source identifier in every uniform data record to identify the source to which the data in the uniform data record is attributed. After the uniform data records are grouped according to States, the source identifiers in the records are used by data masher routines 112-1 through 112-50 described below to determine the source (data providers 302–310) of the data. Because in this example there are five converter routines (converter routines 104A–104E), there can be up to five instances operating in API routine 106. Of course, use of five converter routines here are for illustrative purposes and the number of instances can vary.

Additionally, API routine 106 instructs processor 122 to add or delete one or more new uniform records and accordingly set one or more status flags in normalized database 108. For example, instructed by API routine 106, when processor 122 receives one or more new uniform records from the converter process, processor 122 sets the status of a Changed Flag in location 208 to "Yes". The status "Yes" indicates that a new uniform record has been added or deleted. Similarly, when processor 122 adds or deletes one or more normalized records, processor 122 sets the status of the Changed Flag to "Yes". API routine 106 also instructs processor 122 to communicate to one or more data masher routines 112-1 through 112-50 the need to either add or delete the record, which is described in detail below.

Each source record from a data provider includes art identifier, which is unique to the source record and is provided by the data provider. Because the data provider may use the same identifiers every time it sends source records to system 102, processor 122 assigns its own series of identifiers, namely, primary key indexes, to the source records so that the new source records can be distinguished from the previous source records. In this instance, a primary key index, e.g., a 64-bit value, is used for indexing, updating and searching for source, uniform and normalized data records. The primary key indexes are stored in location 218.

After a particular data provider sends new source data and it is converted to uniform data, processor 122 queries normalized database 108 for the largest primary key index value in location 218 associated with the particular data provider. Once the largest index value is identified, new uniform data records are stored in uniform data location 216 in association with new indexes, having sequentially higher values than the identified largest index value. Thus, any data attributed to the particular data provider that has an index value less than or equal to the identified largest index value represents previous data, which may be deleted if so desired.

Instructed by router routine 120, processor 122 routes all of the uniform data and normalized data to the appropriate Normalized Table 202 based upon which State the record is associated with. The data in the State field within the normalized record identifies which State the record is associated with and which one of normalized tables 109-1 through 109-50 in FIG. 3 to store the normalized data.

Normalizer routine 110 is used to convert uniform data to normalized data in accordance with a predetermined nomenclature. This stems from the fact that the various data providers 302–310 often provide data of similar type in different nomenclatures. For example, one data provider may provide data representing the State of California as "Ca" and a second data provider may provide data representing the State of California as "California". Because this data may be used later on in a comparison process, it is converted to conform to the predetermined nomenclature, such as "CA".

Figure 6:
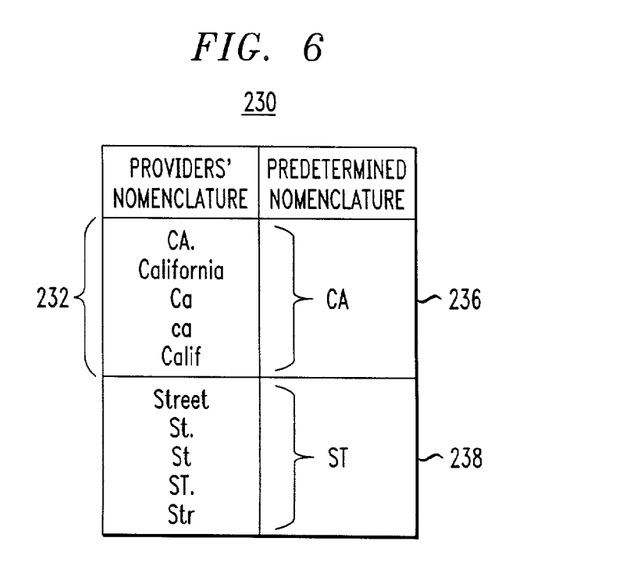
FIG. 6 illustrates a table for converting various names in accordance with a predetermined nomenclature.

FIG. 6 illustrates conversion table 230 for conversion of data in data providers' nonuniform nomenclatures to that in the predetermined nomenclature. Take State data type 232 for example. The State name "California" may be represented by different data providers as "CA.", "Ca", "ca", California, or "Calif". In another example, "Street" may be represented by different data providers as "St.", "Street", "st", "ST." or "Str." As shown by rows 236 and 238 of table 230, normalizer routine 110 instructs processor 112 to convert various representations of "California" and "Street" to normalized data "CA" and "ST", respectively, in accordance with the predetermined nomenclature.

Generally, normalizing data involves reading uniform data, checking for conformity among the uniform data and, where necessary., converting the uniform data into the predetermined nomenclature. Normalizer routine 110 instructs processor 122 to read the uniform data and separate the uniform data into components, to prepare the uniform data for changes and conversion to normalized data. Processor 122 may separate an address into components representing a house or building number, street name, street type, apartment number, etc.

Figure 4E:
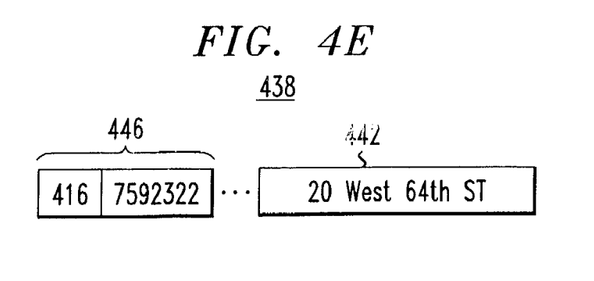
FIGS. 4E and 4F illustrate normalized data records.
Figure 4F:
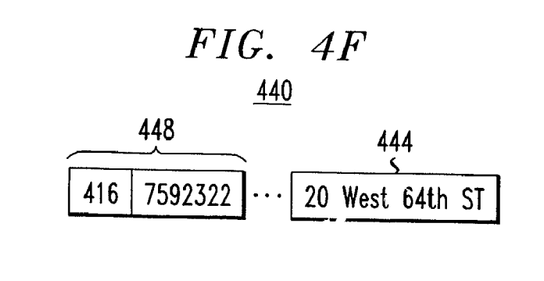

Referring back to FIGS. 4C and 4D, uniform data record 434 has an address 20 WEST 64th Street, which is separated into the following components (A) 20 (B) WEST (C) 64th (D) Street. Although uniform data record 436 has the same address, it is indicated as 20 w 64TH St., which is similarly separated into components: (A) 20 (B) w (C) 64 TH (D) ST. The separated components may be converted to conform to the predetermined nomenclature, if necessary. The conversion may include substituting words (abbreviations) and correcting words (correcting abbreviations), resulting in normalized data records 438 and 440 in FIGS. 4E and 4F, respectively. Thus, for example, the addresses in address fields 442 and 444, which conform to the same predetermined nomenclature, are now identical. In this example, the telephone numbers in fields 424 and 426 in uniform data record 434, and those in fields 428 and 430 in uniform data record 436, do not have to be normalized because they already conform to the predetermined nomenclature and are directly transferred to fields 446 and 448 in the respective normalized data records.

Additionally, normalizer routine 110 may instruct processor 122 to remove extensions from the end of telephone numbers. Extensions can be a phone number (alpha or digit) and anything from 1 to 4 digits, ignoring white space. The telephone number is analyzed and checked if it contains letters that need to be substituted for numbers. If a letter substitution would yield a reasonable telephone number and 1 to 7 letter substitutions would yield 7 total digits, then the substitutions are performed, otherwise the record is considered invalid.

After the telephone numbers are normalized, API routine 106 can also instruct processor 122 to perform NPA splits. For example, a telecommunications carrier may change an entire area code, or change the area code for half of telephone numbers in a State to a new area code. In the example where they change the area code of half the telephone numbers in a State, the data provider can send to system 102 a file of NPAs that are changed. The normalized data records containing the changed area codes are added to Normalized Data location 212 and eventually reprocessed by processor 122, in accordance with instructions from a data masher routine.

In addition, the normalized data records are checked for validity. Each normalized data record in Normalized Data location 212 is associated with a Valid Record Flag in location 210, which indicates whether a particular normalized data record is valid or invalid. API routine 106 instructs processor 122 to query normalized database 108 to set the Valid Record Flags in location 210 to either "Yes" or "No." For example, if a normalized data record has a 13-digit telephone number it is considered invalid and the associated Valid Record Flag is set to "No." On the other hand, if the telephone number is 10 digits long, the associated Valid Record Flag is set to "Yes." Thus, when data masher routines 112-1 through 112-50 are processing normalized data records, invalid normalized data records are identified based on the statuses of the Valid Record Flags, and not included in the process.

Additionally, normalizer routine 110 may check normalized data records for accuracy. For example, telephone numbers and addresses can be checked for accuracy by cross-referencing the data with United States Postal Service (USPS) data. The USPS data is stored in normalized database 108.

Other examples of normalizing listing names involve normalizer routine 110 instructing processor 122 to perform various functions, such as camel-backing the listing, removing odd characters, and removing white space from the extremities of the listing name. Camel-backing is converting data that is in uppercase to lower case, while leaving the first letter in uppercase. It should be realized that normalization standards can change, and, for example, as problems with data are identified, normalizer routine 110 can be reconfigured to solve the problems and the data can be renormalized. The logic used by normalizer routine 110 to perform these functions is stored in a table in normalized database 108. Changing the logic in the table results in reconfiguration of normalizer routine 110.

Normalizing a city name involves the city name being camel-backed, white space is removed or added, and odd characters are removed or added (e.g., for example "23 Ave" or "23th Ave" are both changed to read "$23^{rd}$ Ave"). The city name may also be broken apart into its city name and quadrant (if applicable). The quadrant can include N, S, E, W, NE, NW, SE and SW. ZIP codes are analyzed by determining whether the ZIP is 5 digits, or 4 digits.

Secondary normalizer routine 118 may be used to fix data within the records that were not normalized properly or that were not identified as needing normalization during the initial normalization process by normalizer routine 110. It should be realized that all data is reviewed for possible normalization, but occasionally a normalization problem is identified that requires renormalization of data. Secondary normalizer routine 118 includes the logic for instructing processor 122 to reconfigure the normalization process within normalizer routine 110 and for performing other tasks, such as querying normalized database 108.

Sometimes an error in the data is identified by information assistance personnel. After discovering one such error (e.g. an incorrect city abbreviation), the personnel notifies an administrator of system 102. Referring to FIG. 5, the administrator of system 102, via a user interface, can enter a reconfiguration scheme into system 102. Secondary normalizer routine 118 instructs processor 122 to reconfigure a configuration table with the reconfiguration scheme, and query the uniform data in Uniform Data location 216 that need to be renormalized. The routine instructs processor 122 to send the uniform data to normalizer routine 110 for renormalization. The uniform data is renormalized, which includes modifying uniform data that was not previously identified as requiring normalization. After the uniform data is renormalized into normalized data, the normalized data is stored in Normalized Data location 212.

Last Normalized Date 206 is a location that stores a date and time when a uniform data record was normalized by normalizer routine 110. Because the configuration of normalizer routine 110 can change, the date and time also represents the configuration version that normalizer routine 110 used when that uniform data record was normalized. Associating dates and times with uniform data records allows for secondary normalizer routine 118 to instruct processor 122 to query normalized database 108 for uniform data records based upon a selected date and time. For example, if data was changed on Oct. 23, 2001 at 7:35 AM, then all the uniform data records with a last normalized date before this date and time are normalized a second time. In situations where there is a need to change the normalization process and therefore renormalize all of uniform data, secondary normalizer routine 118 instructs processor 122 to query normalized database 108 to search location 216 for uniform data records having a last normalized date that predates the current normalized date, and instructs processor 122 to normalize such uniform data records.

Generally, when processor 122 normalizes the uniform data, it sets the Changed Flags in location 208 associated with the resulting normalized records to "Yes", and updates the last normalized date in location 206 to the current date and time. It is anticipated that a data masher routine, say, routine 112-1 later on instructs processor 122 to search normalized database 108 for the normalized data records having a Changed Flag set to "Yes," and to further process them in a manner described below.

Figure 7:
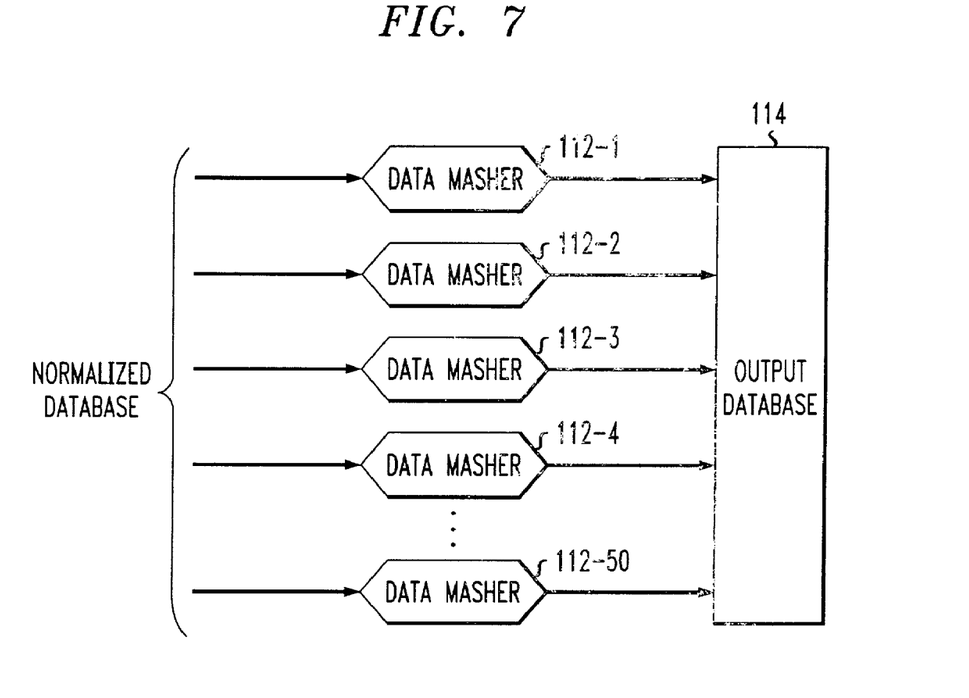
FIG. 7 illustrates a data flow diagram of the back end of the system of FIG. 1.

FIG. 7 illustrates a data flow diagram of the back end of system 102. Instructed by data masher routines 112-1 through 112-50, processor 122 performs various functions, such as querying normalized database 108 for one or more sets of potentially equivalent normalized data records. For each one or more sets of potentially equivalent normalized data records, processor 122 (1) determines which of the potentially equivalent normalized data records within the sets are equivalent normalized data records (2) determines which of the fields from each of the equivalent normalized data records within the sets are accurate and (3) combines accurate fields within the sets into records. The records are then transferred to output database 114. It should be realized that data masher routines 112-1 through 112-50 may be combined into a single routine. In this illustration, 50 data masher routines are used to process data related to 50 states, respectively.

Figure 8:
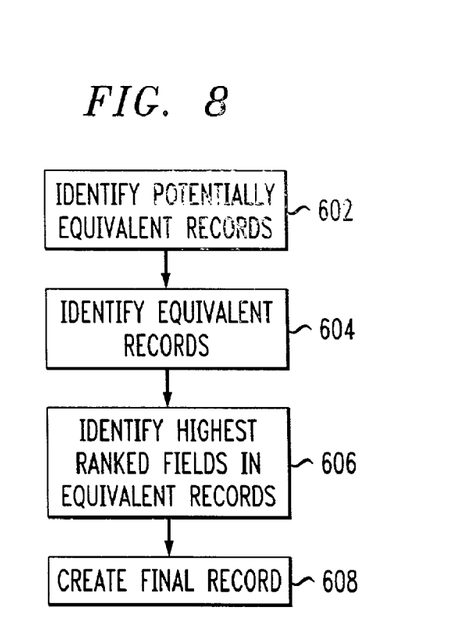
FIG. 8 is a flowchart of a process carried out in the system of FIG. 1.

FIG. 8 illustrates a generic data masher routine representing, say, data masher routine 112-1. Instructed by data masher routine 112-1, processor 122 at step 602 identifies one or more sets of potentially equivalent normalized data records. This is achieved by querying normalized database 108 to search data in Match location 214 for identical telephone numbers. Data in Match location 214 (e.g., telephone numbers) is associated with the records in Normalized Data location 212 and stored there for searching for normalized data records having matched data. It should be realized that each data provider provides one listing for each telephone number in an individual State so that the number of records per listing that have to be compared to each other is relatively small (number of data providers or less). The other fields in the normalized data records (e.g., the address fields) are analyzed by processor 122 to determine a confidence level value for each normalized data record, which is described in detail below.

At step 604, processor 122 determines whether the normalized data records within a set of potentially equivalent normalized data records are actually equivalent. Processor 122 makes such a determination by assigning a confidence level value to every normalized data record in the set. The confidence level is necessary because, for example, two normalized data records can have the same telephone numbers, states, listing names, zip codes, but different addresses. A field-by-field comparison of these two normalized data records would indicate that these records are different, when, in fact, the only difference between normalized data records is the address.

Confidence level values are assigned to the potentially equivalent normalized data records to determine whether the normalized data records are equivalent. For example, the higher the confidence level the more likely the normalized data records are equivalent and the more likely the fields will be shared to construct a record. Processor 122 compares each normalized data record within a set to the other normalized data records in the set, on a field-by-field basis, and determines whether the normalized data records are equivalent, based upon their confidence level values. Every time data within two similar fields are found to be identical, the confidence level increases. The greater count of identical fields, the higher the confidence level value. For example if four out of five fields are identical, then the confidence level value is four, which is considered high and, thus it is concluded that equivalent normalized data records exist.

It should be noted that in another embodiment, the field-to-field comparison of normalized data is enhanced by use of a SOUNDEX algorithm, which determines whether corresponding words in normalized data records are sound-equivalent. This stems from my observation that data providers may rely on voice recognition technology to perform source data entry. That is, the source data is entered based on a machine's recognition of a person's utterance thereof. For example, a town named "Sunnyvale" may have been incorrectly entered textually by a voice-to-text converter as "Sunnyveil" because of their identical pronunciation. Thus, by also using the SOUNDEX algorithm in the field-to-field comparison, the corresponding words from two normalized data records which would otherwise be considered different because of their textual differences may be considered the same when it is determined that they are sound-equivalent.

In addition, if normalized data from the address fields from two normalized data records are compared and it is determined that there is a difference between the data (e.g., "Sunnyvale" vs. "Sunnyveil"), the aforementioned USPS database may be cross-referenced to determine which normalized data is correct, which improves the accuracy of the record.

Data masher routine 112-1 utilizes a threshold level value for determining whether the confidence levels have reached a minimum level of acceptance. The threshold level value is a predetermined value that the confidence level values must equal or exceed for processor 122 to consider normalized data records equivalent. All the normalized data records within a set of potentially equivalent normalized data records that are determined to have confidence level values that equal or exceed the threshold level value are considered equivalent.

Once equivalent normalized data records are identified, at step 606 processor 122 identifies, for each data field, the highest ranked data field of all the corresponding data fields in the equivalent records. In this instance, the highest ranked data field is contributed by the data provider having the highest reliability ranking with respect to such a field. To that end, the data providers are ranked for each data field in terms of their reliability with respect to the field. Such reliability rankings are based upon past ratings of the accuracy of data contributed by the respective providers to the field. The reliability rankings are stored in a table (not shown) in memory 124. For example, if a particular data provider is known for providing extremely accurate street names, fields with street names from this data provider are assigned a relatively high ranking associated therewith. If this same data provider is known for providing inaccurate city names, fields with city names from this data provider are assigned a relatively low ranking associated therewith.

Specifically, processor 122 retrieves the reliability rankings from the table, groups the fields and associated ranking values by "field type," and selects the highest ranking value and associated normalized data for each "field type". The "field type" refers to the category of the field, e.g., street name and city name. Thus, for example, processor 122 selects those normalized data in the street name field, the city name field, and other fields contributed by their respective highest ranked data providers. Processor 122 at step 608 combines the selected data to create a final record.

The final record is stored in Output Data location 222, and is assigned a primary key index in location 224. Each of the normalized data records contributing to the final record is assigned an output index which is the same as the primary key index of the final record, and which is stored in Output Index location 204. Accordingly, if an incorrect final record is identified in Output Data location 222, the contributing normalized data records can be readily determined by relating the primary key index of the incorrect final record to their same output index.

When a particular normalized data record is to be deleted, API routine 106 instructs processor 122 to query normalized database 108 to set the associated Changed Flag in location 208 to "Yes" and initiate data masher routine 112-1, removing the deleted normalized data record from consideration. Data masher routine 112-1 instructs processor 122 to perform steps 602–608 without contribution from the deleted normalized data record. This process yields a second final record that has data selected from one or more equivalent normalized data records, with no regard for the deleted normalized data record. This second final record may or may not be same as the previous final record. Processor 122 then sets the associated Changed Flag to "No," and a new primary key index value is assigned to the second final record. The new primary key index and the second final record are stored in locations 224 and 222, respectively, in Final Table 220.

When a particular normalized data record is to be added, API routine 106 instructs processor 122 to query normalized database 108 to set the associated Changed Flag to "Yes", and initiate data masher routine 112-1, taking the newly-added normalized data record into consideration. Processor 122 then performs steps 602–608 with the newly-added normalized data record included. This process yields a third final record that has data selected from one or more equivalent normalized data records, including the newly-added normalized data record. This third final record may or may not be the same as the previous final record. Data masher routine 112-1 then instructs processor 122 to set the associated Changed Flag to "No," and a new primary key index value is assigned to the record. The new primary key index and the third final record are stored in locations 224 and 222, respectively, in Final Table 220.

The above presents various principles and features of the invention through descriptions of various embodiments. It is understood that skilled artisans can make various changes and modifications to the embodiments without departing from the spirit and scope of this invention, which is defined by the following claims.

What is claimed is:

1. A method for maintaining records in a database comprising:
   (a) receiving at least a collection of first data items and a collection of second data items;
   (b) disposing the first data items in a plurality of fields arranged in a predetermined format to form a first assemblage;
   (c) disposing the second data items in a plurality of fields arranged in the predetermined format to form a second assemblage;
   (d) performing a normalization process to modify selected ones of the first data items and the second data items to conform to predetermined nomenclature, the normalization process being a function of time;
   (e) associating a time of the normalization process with the first assemblage and second assemblage to facilitate renormalization of the first assemblage and second assemblage based on the time;
   (f) maintaining a record, in the database, having a plurality of fields arranged in the predetermined format;
   (g) determining whether a first particular data item in the predetermined nomenclature in a selected field of the first assemblage is identical to a second particular data item in the predetermined nomenclature in a field of the second assemblage corresponding to the selected field; and
   (h) if it is determined that the first particular data item in the predetermined nomenclature is identical to the second particular data item in the predetermined nomenclature, including in a field in the record a selected one of (1) the first data items in the predetermined nomenclature and (2) the second data items in the predetermined nomenclature.

2. The method of claim 1 wherein at (b) and (c) the first data items and the second data items are separated, rearranged, or combined to form the first assemblage and the second assemblage respectively.

3. The method of claim 1 wherein at (h) the first data items and the second data items are assigned accuracy rankings and are selected based upon their accuracy rankings.

4. A system for maintaining records in a database comprising:
   a communications interface for receiving at least a collection of first data items and a collection of second data items;
   a converter for disposing the first data items in a plurality of fields arranged in a predetermined format to form a first assemblage, and for disposing the second data items in a plurality of fields arranged in the predetermined format to form a second assemblage;
   a processor configured to perform a normalization process to modify selected ones of the first data items and the second data items to conform to predetermined nomenclature, the normalization process being a function of time, a time of the normalization process being associated with the first assemblage and second assemblage to facilitate renormalization of the first assemblage and second assemblage based on the time;
   a database for maintaining a record, in the database, having a plurality of fields arranged in the predetermined format; and
   a data masher for determining whether a first particular data item in the predetermined nomenclature in a selected field of the first assemblage is identical to a second particular data item in the predetermined nomenclature in a field of the second assemblage corresponding to the selected field, and for including in a field in the record a selected one of (1) the first data items in the predetermined nomenclature and (2) the second data items in the predetermined nomenclature, if it is determined that the first particular data item in the predetermined nomenclature is identical to the second particular data item in the predetermined nomenclature.

5. The system of claim 4 wherein each of the first assemblage of data items and the second assemblage of data items in the predetermined nomenclature are associated with data accuracy rankings.

6. The system of claim 5 wherein the data masher selects the first data items and the second data items based upon the data accuracy rankings.

7. A system for maintaining records in a database comprising:
   a converter for converting at least a first collection of data items and a second collection of data items to at least a first assemblage and second assemblage, respectively, the first and second assemblages each having data items in fields which are arranged in a predetermined format;
   a processor configured to perform a normalization process to convert selected data items of the first assemblage and the second assemblage to conform to a predetermined nomenclature, the normalization process being a function of time, a time of the normalization process being associated with the first assemblage and second assemblage to facilitate renormalization of the first assemblage and second assemblage based on the time;
   a database for maintaining a record having a plurality of fields arranged in the predetermined format; and
   a data masher for determining a value representing a number of corresponding fields in the first assemblage and the second assemblage having identical data items therein, the data masher based on the value selecting at least one of the data items in the first assemblage and the second assemblage to form the record.

8. The system of claim 7 wherein the converter separates, rearranges, or combines data to form the first assemblage of data items and the second assemblage of data items.

9. The system of claim 7 wherein each of the of the first assemblage of data items and the second assemblage of data items in the predetermined nomenclature are associated with data accuracy rankings.

10. The system of claim 9 wherein the data masher selects data items in the first assemblage and the second assemblage based upon the data accuracy ratings.

11. A system for maintaining records in a database comprising:
   a converter for converting first records containing data items to uniform records having the data items organized in a uniform format, wherein the uniform records have one or more of the data items conforming to a predetermined nomenclature and a balance of the one or more of the data items not conforming to the predetermined nomenclature;
   a processor configured to perform a normalization process to convert the balance of the one or more data items to the predetermined nomenclature, and producing a collection of second records each having selected data items organized in fields according to the uniform format, the selected data items conforming to the predetermined nomenclature, the normalization process being a function of time, a time of the normalization process being associated with the uniform records to facilitate renormalization of the uniform records based on the time; and a data masher for selecting, from among the second records, at least a first selected record and a second selected record based on a value representing a number of corresponding fields in the first selected record and the second selected record having identical data items therein, and for selecting data items from the first selected record and second selected record to form a third data record, the third data record being stored in the database.

12. The system of claim 11 wherein the converter separates, rearranges, or combines the fields and the data items, from the first records, into the uniform format.

13. The system of claim 11 wherein before the the balance of the one or more data items is converted, the one or more data items are separated into components.

14. The system of claim 11 wherein the data masher determines that the first selected record and the second selected record are equivalent if the value is above a predetermined threshold level value.

15. Software recorded in a computer-readable medium, said software including computer-readable instructions for performing a process for building a database, to store records corresponding to a plurality of data items, the process comprising:
  (a) receiving at least a collection of first data items and a collection of second data items;
  (b) disposing the first data items in a plurality of fields arranged in a predetermined format to form a first assemblage;
  (c) disposing the second data items in a plurality of fields arranged in the predetermined format to form a second assemblage;
  (d) performing a normalization process to modify selected ones of the first data items and the second data items to conform to predetermined nomenclature the normalization process being a function of time;
  (e) associating a time of the normalization process with the first assemblage and second assemblage to facilitate renormalization of the first assemblage and second assemblage based on the time;
  (f) maintaining a record, in the database, having a plurality of fields arranged in the predetermined format;
  (g) determining whether a first particular data item in the predetermined nomenclature in a selected field of the first assemblage is identical to a second particular data item in the predetermined nomenclature in a field of the second assemblage corresponding to the selected field; and
  (h) if it is determined that the first particular data item in the predetermined nomenclature is identical to the second particular data item in the predetermined nomenclature, including in a field in the record a selected one of (1) the first data items in the predetermined nomenclature and (2) the second data items in the predetermined nomenclature.

16. The process of claim 15 wherein at (b) and (c) the first data items and the second data items are separated, rearranged, or combined to form the first assemblage and the second assemblage respectively.

17. The process of claim 15 wherein at (h) the first data items and the second data items are assigned accuracy rankings and are selected based upon their accuracy rankings.

18. A method for maintaining records in a database comprising:
  converting first records containing data items to uniform records having the data items organized in a uniform format, wherein the uniform records have one or more of the data items conforming to a predetermined nomenclature and a balance of the one or more data items not conforming to the predetermined nomenclature;
  performing a normalization process to convert the balance of the one or more data items to the predetermined nomenclature, the normalization process being a function of time, a time of the normalization process being associated with the uniform records to facilitate renormalization of the uniform records based on the time;
  producing a collection of second records each having selected data items organized in fields according to the uniform format, the selected data items conforming to the predetermined nomenclature; and
  selecting, from among the second records, at least a first selected record and a second selected record based on a value representing a number of corresponding fields in the first selected record and the second selected record having identical data items therein; and
  selecting data items from the first selected record and second selected record to form a third data record, the third data record being stored in the database.

19. The method of claim 18 wherein the fields and the data items, from the first records, are separated, rearranged, or combined.

20. The method of claim 18 wherein the balance of the one or more data items are separated into components and converted into the predetermined nomenclature.

21. The method of claim 18 wherein the first selected record and the second selected record are determined to be equivalent if the value is above a predetermined threshold level value.

* * * * *